United States Patent [19]
Singer et al.

[11] 3,743,224
[45] July 3, 1973

[54] TYPEWRITER SWIVEL LOCK MOUNT

[76] Inventors: M. Leonard Singer, 1500 Cardinal Drive, Little Falls, N.J. 07424;
Robert M. Woletz, 294 Buttonwood Drive, Paramus, N.J. 07652

[22] Filed: June 23, 1971

[21] Appl. No.: 155,717

[52] U.S. Cl............ 248/23, 211/4, 248/203, 248/289, 248/25
[51] Int. Cl............................................. F16m 13/00
[58] Field of Search ............. 248/2, 19, 23, 25, 248/203, 289, 349, 361; 211/4

[56] References Cited
UNITED STATES PATENTS

| | | | |
|---|---|---|---|
| 3,321,165 | 5/1967 | Wann | 248/203 |
| 3,128,979 | 4/1964 | Damelio | 248/25 |
| 583,943 | 6/1897 | Rayman | 248/289 X |
| 3,645,057 | 2/1972 | Kaplan | 248/349 |
| 3,664,616 | 5/1972 | Raskin | 248/25 |

*Primary Examiner*—William H. Schultz
*Attorney*—John J. McGlew et al.

[57] ABSTRACT

A swivel lock mount particularly for mounting an operating device, such as a typewriter on a stand in a position such that it cannot be stolen but so that it can be moved backwardly and forwardly, includes a transversely extending lock bar which has openings therethrough through which securing bolts are passed and engaged into the bottom of a carriage of the device to be secured. The lock bars extend through a guide plate having a through slot through which the bar extends. The slot has great transverse and longitudinal dimensions in order to permit the bar to be slid backwardly and forwardly and to and fro for the purpose of positioning the article in any desired operating position in respect to the guide plate. The guide plate is secured to a mounting stand by engagement of a bolt which extends through the mounting stand and is threaded into the plate. A feature of the construction is that the bolt may be enclosed at its underside and by a lock mechanism which engages over the head of the bolt or a nut therefor and which prevents contact of the nut or the bolt for the purpose of disengaging it from its threaded connection to the guide plate so that, once the device is positioned on a mounting stand, it can only be removed by unlocking the locking mechanism.

8 Claims, 4 Drawing Figures

Patented July 3, 1973

3,743,224

INVENTORS
M. LEONARD SINGER
ROBERT M. WOLETZ
BY
John J. McGlew
ATTORNEY

TYPEWRITER SWIVEL LOCK MOUNT

BACKGROUND OF THE INVENTION

1. Field of the Invention

This invention relates in general to devices for securing articles against pilferage and, in particular, to a new and useful swivel lock bar construction for mounting an operating article such as a typewriter, and which includes a guide plate through which a mounting bar for the article is passed in a manner permitting the bar with the article to be pivoted and moved to and fro and which is secured in position to a mounting stand by a locking device.

2. BACKGROUND OF THE PRIOR ART

Because of the high crime rate, it becomes increasingly important to provide means for securing such every day operating articles as typewriters, adding machines, etc., so that they cannot be removed from a mounting place located in an office, for example. At the present time, it is not sufficient to merely bolt these articles to the mounting base since in many instances they are removed by unthreading the bolting connections. Locks are known for securing the bolted connections but a disadvantage in such an arrangement is that the articles are permanently fixed in a immovable spot and cannot be moved even slightly in order to provide minimum adjustment thereof.

SUMMARY OF THE INVENTION

This invention is an improvement over the prior art primarily in respect to the provision of a swivel mounting block for an article such as a typewriter which includes a bar which is adapted to be secured to the underside of the typewriter and which engages through a through slot of a lock plate or guide plate which is fixed to the mounting base. The lock plate is provided with a slot which is wide enough and long enough so that the through bar may be slid backwardly and forwardly to and fro or pivoted at an angle as desired in order to position the operating device in any desired orientation within predetermined limits regulated by the size of the guide plate. The plate is secured to a mounting base by a threaded bolt which engages into a central receiving threaded opening of the plate and which is locked at its exposed end by a locking device so that the device once installed cannot be removed unless it is unlocked.

Accordingly, it is an object of the invention to provide an improved means for locking an operating article such as a typewriter in a manner permitting it to be shifted within limits for adjustment purposes.

A further object of the invention is to provide a device for securing a typewriter and the like to a mounting base which includes a lock plate guide through which a bar member is passed and wherein the bar member is connected to the typewriter or other article and may be shifted relative to the guide plate, and including means for engaging the guide plate which may be locked at its exterior.

A further object of the invention is to provide a locking device for an article such as a typewriter which is simple in design, rugged in construction and economical to manufacture.

The various features of novelty which characterize the invention are pointed out with particularlity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
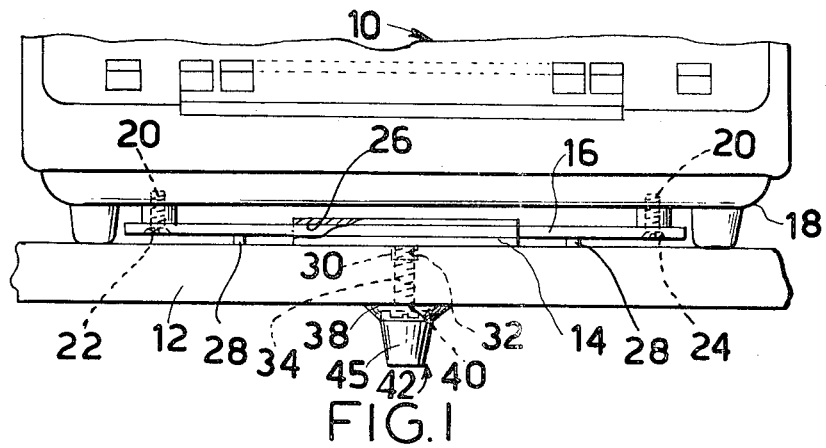
FIG. 1 is a front elevational view partly in section of a locking device for locking a typewriter to a mounting stand.
Figure 2:
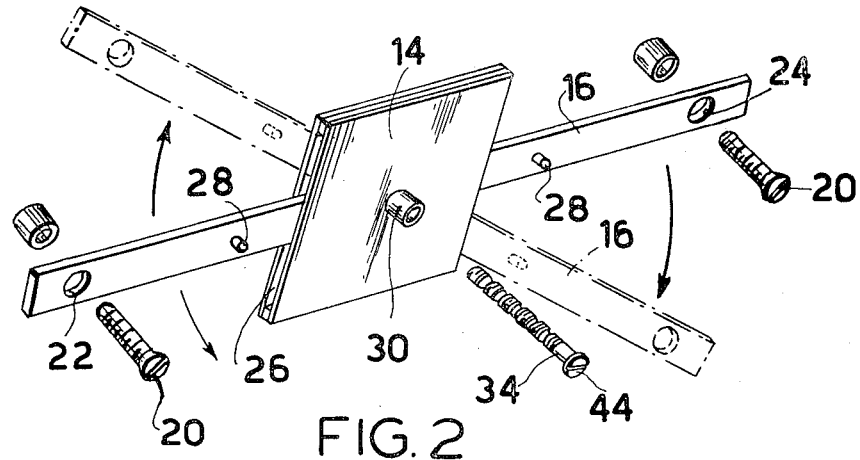
FIG. 2 is an exploded perspective view indicating the locking device and the associated parts therefor.
Figure 3:
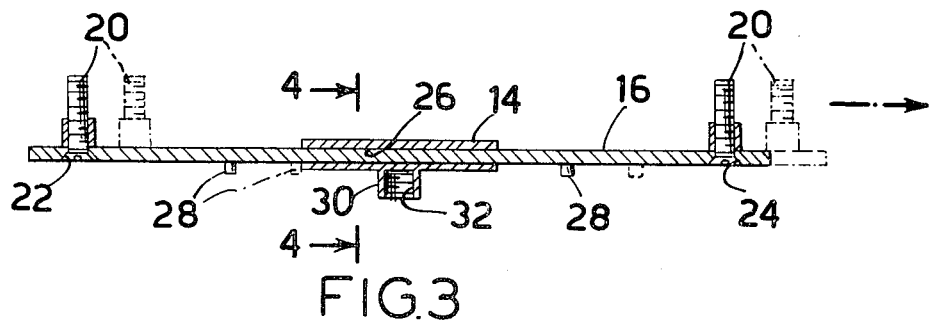
FIG. 3 is a transverse sectional view of the locking device.
Figure 4:
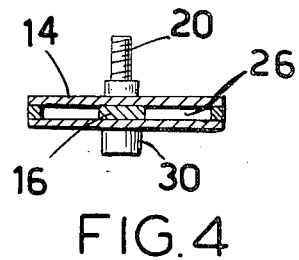
FIG. 4 is a section taken along the line 4—4 of FIG. 3.

Referring to the drawings in particular, the invention embodied therein comprises a device for locking an article such as a typewriter 10 to a mounting base 12 and which includes a swivel mount formed of a guide plate or lock plate 14 and a mounting bar 16.

In accordance with the invention, the mounting bar 16 is secured to the underside or bottom 18 of the typewriter by securing bolts 20 which extend through openings 22 and 24 at respective ends of the bar 16 and engage into threaded receiving openings which are provided on the underside 18 of the typewriter 10. The mounting bar 16 extends through a slot 26 of the lock plate 14 and thus is permanently engaged with the plate 14 and is prevented from being withdrawn from the plate by projections 28 which are formed on the mounting plate 16. The slot 26 is both wide and long and it permits pivotal as well as back and forward movement of the mounting plate 16 so that the typewriter may be adjusted in position or shifted angularly as desired once the typewriter is mounted to the locking device.

After the typewriter 10 is secured to the locking device by engagement of the bolts 20 into the typewriter, the lock plate 14 is positioned so that a projecting boss 30 extends downwardly into a receiving opening 32 defined on the mounting base 12. A bolt 34 which is provided with a plurality of annular grooves to facilitate easy cutoff is sized so that it will extend through the mounting base 12 and engage into the threaded interior of the boss 30.

Before the bolt is passed through the defined opening of the base 12, it is passed through the through opening 40 of a member 38 which forms part of a locking device generally designated 42. The exposed head 44 of the bolt 34, or a nut which may be used instead of the head 44, is contained within the interior of the device 38 and covered by an outside part 45 of the locking device so that there is no access to the head. The part 45 advantageously carries a key-operated lock which is engaged with the part 38 to cover the head 44. The locking device 42 is of the type disclosed in U.S. application Ser. No. 794,047, filed Jan. 27, 1969.

Thus, the device provides a simple means for securing an article such as a typewriter to a mounting base by using only a single securing element such as a securing bolt which is protected from the outside by a locking device, and which provides a guide plate mounting the typewriter such that it may be moved backwardly and forwardly or pivoted angularly in order to accurately position it in an operating position.

While a specific embodiment of the invention has been shown and described in detail to illustrate the application of the principles of the invention, it will be understood that the invention may be embodied otherwise without departing from such principles.

What is claimed is:

1. An article mounting device for mounting an article such as a typewriter, an adding machine, etc., to a mounting base, comprising a guide plate having means for securing said guide plate to the mounting base and having a through slot defined thereon, and a one piece flat longitudinally elongated mounting bar having means adjacent each end for securing said mounting bar to the article to be mounted and extending through the guide slot of said guide plate, said mounting bar having a projection on each side of said plate wider than the slot confining said mounting bar for movement along said slot to within a predetermined distance determined by the spacing of said projections and preventing the withdrawal of said bar from said slot so that it is engaged with said guide plate.

2. An article mounting device for mounting an article such as a typewriter, and adding machine, etc., to a mounting base, comprising a guide plate having means for securing said guide plate to the mounting base and having a through slot defined thereon, and a mounting bar having means adjacent each end for securing said mounting bar to the article to be mounted and extending through the guide slot of said guide plate, said mounting bar having means confining said mounting bar for movement along said slot and preventing its withdrawal from said slot so that it is engaged with said guide plate, said slot being wider than said bar so that said bar may be moved longitudinally in said slot and to and fro and pivoted.

3. An article mounting device for mounting an article such as a typewriter, an adding machine, etc., to a mounting base, comprising a guide plate having means for securing said guide plate to the mounting base and having a through slot defined thereon, and a mounting bar having means adjacent each end for securing said mounting bar to the article to be mounted and extending through the guide slot of said guide plate, said mounting bar having means confining said mounting bar for movement along said slot and preventing its withdrawal from said slot so that it is engaged with said guide plate, said means on said guide plate for securing it to a mounting base including a boss extending outwardly from the underside of said plate for engagement through a bore of the mounting base, said boss being threaded, and a threaded securing member engaged in said threaded boss for holding said boss to the mounting base.

4. An article mounting device according to claim 3, including a lock covering said securing bolt on the exterior thereof for preventing its withdrawal from said guide plate.

5. An article mounting device according to claim 4, wherein said lock for securing said bolt comprises a first part adapted to fit against said mounting base and having an opening for the passage of the bolt therethrough, a second part engageable over the bolt and covering said bolt against access, and lock means carried by said second part for locking said second part to said first part.

6. An article mounting device according to claim 5, wherein said bolt includes a plurality of axially spaced grooves along the length thereof for facilitating the cut-off of the bolt in accordance with the thickness of said mounting base.

7. An article mounting device for mounting an article such as a typewriter, an adding machine, etc., to a mounting base, comprising a guide plate having means for securing said guide plate to the mounting base and having a through slot defined thereon, and a mounting bar having means adjacent each end for securing said mounting bar to the article to be mounted and extending through the guide slot of said guide plate, said mounting bar having means confining said mounting bar for movement along said slot and preventing its withdrawal from said slot so that it is engaged with said guide plate, said guide plate comprising a rectangular plate assembly having a through slot therethrough of a dimension much wider than said bar, said bar passing through said slot and being pivotal and movable therein in all directions.

8. An article mounting device according to claim 7, wherein said means on said bar for preventing its withdrawal from said slot includes a projection on said bar on each side of said guide plate.

* * * * *